Figure 1:
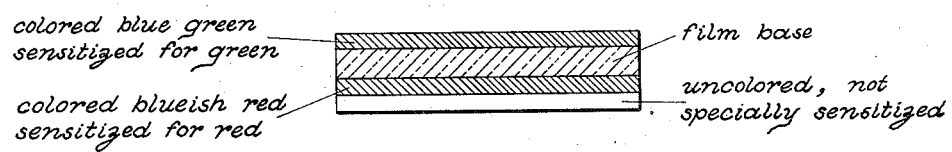

June 25, 1940.   A. VON BIEHLER   2,205,755
COLOR PHOTOGRAPHY
Filed Nov. 22, 1935

INVENTOR
Arpad von Biehler
BY
ATTORNEYS

Patented June 25, 1940

2,205,755

UNITED STATES PATENT OFFICE 2,205,755

COLOR PHOTOGRAPHY

Arpad von Biehler, Dessau, Germany, assignor, by mesne assignments, to General Aniline & Film Corporation, New York, N. Y., a corporation of Delaware Application November 22, 1935, Serial No. 51,029
In Germany November 23, 1934

2 Claims. (Cl. 95—2)

My present invention relates to color photography and more particularly to color photographic printing.

One of its objects is to provide an improved process of color photographic printing. Another object is the film to be used in my color photographic printing process. Further objects will be seen from the detailed specification following hereafter.

A photographic material for printing component color pictures is known which consists of layers cast one upon the other and having the three fundamental colors. A similar material is known in which the several layers are not colored and are differentiated merely by different color sensitiveness.

According to this invention it has been found that for printing multi-color pictures a printing material is used with advantage which consists of a combination of uncolored and colored layers, of which the dyestuff pictures in the uncolored layers, which may be produced by subsequent coloring or by previously incorporated color formers in the development (cf. German Patent 253,335) are united with the dyestuff pictures, which are produced in the usual dyed layers, to form the finished dyestuff picture.

The arrangement of the layers is such that the uncolored layer receives the incident light for printing. This produces the advantage that the illumination of the lower layer is not affected by the color of the upper layer. The incorporation of uncolored layers in the material has the further advantage that the coloring or the dyestuff image in the uncolored layers can be assimilated to the dyestuff pictures in the already colored layer after the development so that by treatment of varying duration in the dye-baths or by the choice of suitable tints of dye, there is attained a further wide range of adjustment. The layers are sensitized for the different spectral regions and the colored layers are dyed the color for which the layers are sensitized.

The illumination of such layers does not present any difficulties since the layers that are still uncolored present no hindrance to the light required for the other layers.

For the several layers positive or negative printing material may be used, for example on the uncolored layer, which later may receive by coloring or toning a blue picture, a negative is printed, while on the already colored layer, which later after a silver bleaching-out process, is to receive the colored image a positive is printed. This process has a particular importance, when, for example, there is used as the material to be exposed for three-color photography a lenticular bi-pack, of which the lenticular front film, in order to produce the best result, is advantageously developed by the reversal process to a positive, while the smooth back film is developed as usual to a negative. In this case the lenticular positive is printed on the colored layers of the support, while the normal negative is printed on the uncolored layer.

Furthermore, it is of advantage to select the coloring of the third layer in respect to that of the layer already dyed before development, so that a neutral black is produced. Then in the further operation, in which the dyestuff is destroyed on the parts which contain silver or are silver free, there is also produced a neutral grey.

The subsequent coloring of the colorless layer involves the further advantage that the dyestuff absorbed by the surface becomes distributed topographically in the layer, correspondingly with the silver image produced by the development, particularly in the case of the yellow component. In the surface first affected by the light, there is the highest concentration, diminishing with the depth in the layer until at the transition parts where the color passes to another one there is practically no color present. The colored images contained in the two adjacent layers appear, therefore, clearly separated. This distribution of the dyestuff image within the layer can be favored by particular additions, for example by an agent such as a guanidine derivative capable of precipitating the dyestuff.

The following examples when taken with the accompanying, self-explanatory drawing depicting sections through embodiments of my film serve to illustrate the invention:

Example 1

A film prepared on both faces is coated on one face with an emulsion colored blue-green by means of Chicago Blue, (Schultz Farbstofftabellen, 13th edition, vol. I, No. 509) and if desired sensitized for green, while the other face is coated with an emulsion dyed with Sirius Ruby, (Schultz Farbstofftabellen, 13th edition, vol. II, page 198) and is sensitized for the red region of the spectrum. On this layer is coated an uncolored and not specially sensitized layer (see Fig. 1). After exposure of the corresponding component picture with the suitable printing light (the blue green dyed layer is illuminated by means of green light if sensitized for green and by means of blue light if not specially sensitized)

and subsequent development, the uncolored layer is dyed by means of a suitable yellow solution, for instance a solution of Chrysophenine Yellow (Schultz Farbstofftabellen, 13th edition, vol. I, No. 726), until the film appears by transmitted light to be of a neutral grey, and is then bleached out in a bath which bleaches out the parts containing the silver deposit, for instance, in the manner described in British Patent No. 401,340. It is also possible to arrange all the layers on one face of the film without changing the process.

Example 2

Figure 2:
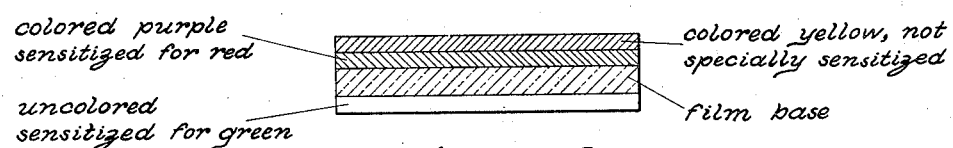

A film is coated on the one face with a red-sensitized emulsion colored purple by means of Supranol Brilliant Red (Schultz Farbstofftabellen, 13th edition, vol. II, page 204); it is then coated with an emulsion which is not specially sensitized and colored yellow by means of Chrysoidine (Schultz Farbstofftabellen, 13th edition, vol. I, No. 27). On the other face of the film there is coated an uncolored green-sensitized emulsion. (See Fig. 2.) The two colored layers of emulsion are exposed behind positives while the back face is illuminated behind a negative. The purple layer is exposed through the uncolored layer and the support. After development the double film is bleached-out on one face with a silver bleaching out bath for instance, that described in British Patent No. 401,340, while on the other face it is converted into a blue image by means of a ferrocyanide bath. Obviously, the sequence of the production of the several colored images, if necessary after varnishing the ferrocyanide image first produced for protecting it against the bleaching bath, may be otherwise than that described.

What I claim is:

1. A photographic material for use in color photographic printing which comprises a single support carrying on one side an uncolored emulsion layer sensitized for green, and carrying on the other side two emulsion layers, the emulsion layer next to the support being colored with a purple acid azo dye and sensitized for red, and the layer remote from the support being dyed with a yellow acid azo dye and not specially sensitized.

2. The process of printing onto a multi-layer material comprising a support, at least three layers on said support with at least two layers in superimposition, said layers being sensitized for different regions of the spectrum, at least two layers being colored for the region for which they are sensitized and at least one outer layer being uncolored which comprises exposing behind a negative and from one side of the support the uncolored layer and from the same side behind a positive the next adjacent colored layer, exposing behind a positive another colored layer from the other side of the support, developing the exposed material, converting the dyed layers into positives by a silver-bleaching out bath and toning the uncolored layer.

ARPAD von BIEHLER.